(12) United States Patent
Kwon et al.

(10) Patent No.: US 8,432,885 B2
(45) Date of Patent: Apr. 30, 2013

(54) SYSTEM AND METHOD FOR CHANNEL STATUS INFORMATION FEEDBACK IN A WIRELESS COMMUNICATIONS SYSTEM

(75) Inventors: Young Hoon Kwon, San Diego, CA (US); Yang Tang, San Diego, CA (US); Tao Wu, Carlsbad, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1049 days.

(21) Appl. No.: 12/423,485

(22) Filed: Apr. 14, 2009

(65) Prior Publication Data

US 2009/0257423 A1 Oct. 15, 2009

Related U.S. Application Data

(60) Provisional application No. 61/044,792, filed on Apr. 14, 2008.

(51) Int. Cl.
*H04J 3/00* (2006.01)
*G01R 31/08* (2006.01)
(52) U.S. Cl.
USPC .......................................... 370/345; 370/227
(58) Field of Classification Search .................... 370/345
See application file for complete search history.

(56) References Cited

U.S. PATENT DOCUMENTS

| | | | |
|---|---|---|---|
| 2003/0072395 A1* | 4/2003 | Jia et al. | 375/341 |
| 2005/0101259 A1* | 5/2005 | Tong et al. | 455/69 |
| 2006/0281462 A1* | 12/2006 | Kim et al. | 455/436 |
| 2007/0066230 A1* | 3/2007 | Zhang et al. | 455/67.11 |
| 2008/0080634 A1* | 4/2008 | Kotecha et al. | 375/267 |
| 2008/0227495 A1* | 9/2008 | Kotecha et al. | 455/562.1 |
| 2009/0016372 A1* | 1/2009 | Tao et al. | 370/437 |
| 2011/0003607 A1* | 1/2011 | Forenza et al. | 455/501 |

\* cited by examiner

*Primary Examiner* — Brandon Renner
*Assistant Examiner* — Gerald Smarth
(74) *Attorney, Agent, or Firm* — Slater & Matsil, L.L.P.

(57) ABSTRACT

A system and method for channel status information feedback in a wireless communications system is provided. A method includes receiving a transmission containing feedback information from a mobile station (MS) having N total antennas, M receive/transmit antennas, N−M receive-only antennas, wherein N and M are integers and N>M, decoding the received transmission, computing estimates of CSI for channel elements of N−M receive-only antennas using the decoded transmission, computing estimates of CSI for channel elements of M receive/transmit antennas using channel reciprocity, and computing a precoding matrix from the channel elements for the N−M receive-only antennas and the M receive/transmit antennas.

33 Claims, 4 Drawing Sheets

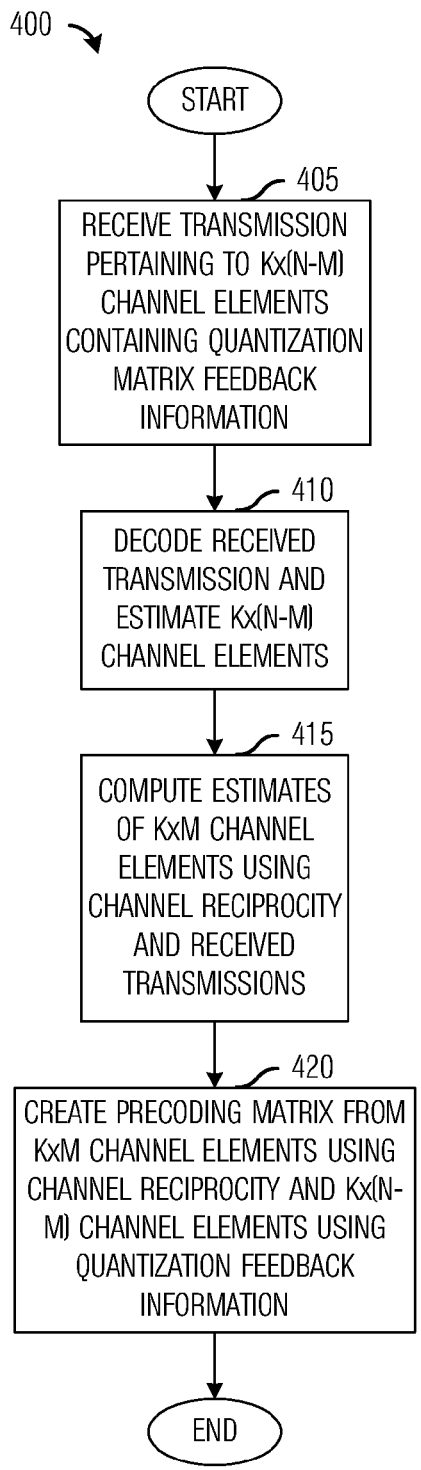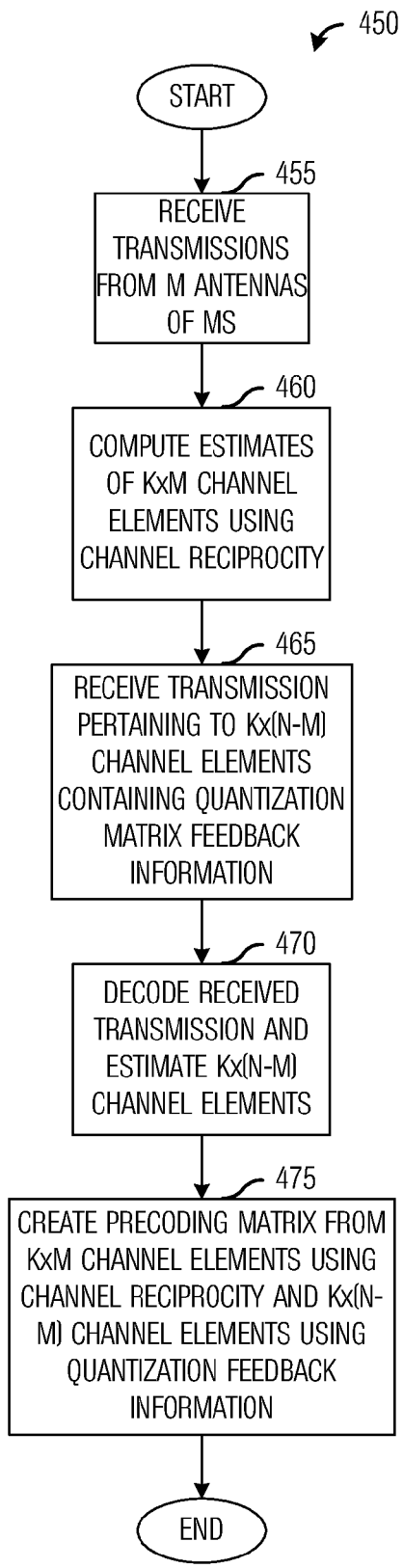
Fig. 4a
Fig. 4b

SYSTEM AND METHOD FOR CHANNEL STATUS INFORMATION FEEDBACK IN A WIRELESS COMMUNICATIONS SYSTEM

This application claims the benefit of U.S. Provisional Application No. 61/044,792, filed on Apr. 14, 2008, entitled "Method and an Apparatus for Channel Status Information Feedback for MIMO Precoding in TDD Mode," which application is hereby incorporated herein by reference.

TECHNICAL FIELD

The present invention relates generally to wireless communications, and more particularly to a system and method for channel status information feedback in a wireless communications system.

BACKGROUND

In order to achieve better channel utilization and increase overall performance, multiple transmission and multiple reception antennas (also commonly referred to as multiple input, multiple output (MIMO)) at both base station (BS) and mobile station (MS) are considered.

Generally, to have better spectral efficiency, a transmitter in a MIMO system needs to know channel status information (CSI) of channels between transmitter and receiver antennas. To this end, several CSI feedback techniques have been proposed, including: i) codebook index feedback, ii) quantized channel feedback, iii) analog channel feedback, iv) use of channel reciprocity (especially for wireless communications systems operating in time division duplex (TDD) mode), and so forth.

In a wireless communications system operating in TDD mode, both downlink (DL) and uplink (UL) utilize the same frequency band, with the DL and the UL being separated by time. If the wireless communications system is using channel reciprocity, then a received signal at the BS may be used to estimate the channel from BS to a MS (i.e., the DL channel). In this case, the BS can estimate the DL channel based on the UL channel by using either an UL traffic channel or an UL sounding channel transmitted especially for UL channel estimation.

In a typical MS, there are more receiver antennas than transmitter antennas. This is due to the fact that transmitter antennas are generally more expensive to implement due to their costly power amplifiers, for example. Therefore, a BS may not have full channel status information when using channel reciprocity in a wireless communications system operating in TDD mode because each MS may transmit using only a subset of its antennas.

For example, in a wireless communications system operating in TDD mode, if a BS has K transmit antennas and K receive antennas, and a MS has N total antennas, M receive/transmit antennas, and N−M receive-only antennas with N>M, then for DL MIMO transmission, the BS is required to know the channel status information of K×N channel elements. However, since the MS transmits only on M antennas, the BS can have CSI only of K×M channel elements. Therefore, the BS does not have full CSI and the wireless communications system may not be able to operate at maximum efficiency. The BS therefore needs another type of feedback mechanism that may be used to provide channel status information for the remaining K×(N−M) channel elements.

Alternative techniques may be used to achieve full channel status information. One technique involves the use of a feedback mechanism that is used in a wireless communications system operating in frequency division duplex (FDD) mode rather than channel reciprocity. However, such feedback mechanisms usually have higher overhead than channel reciprocity.

Another technique may be to use CSI for K×M channel elements only, while leaving the remaining K×(N−M) channel elements with no CSI. However, since the BS can identify only a portion of the channel information, the transmission efficiency of the BS may be lower than what is achievable with full channel information.

Yet another technique may be to use antenna switching at the MS. With antenna switching at the MS, the MS may periodically switch it's transmit and receive antennas so that over time, the BS can have CSI for all K×N channel elements. However, this technique may require a significant amount of time to elapse before the BS can have CSI for all K×N channel elements (i.e., it may take longer to acquire the full CSI because the MS has to report CSI to the BS multiple times). Additionally, both the BS and the MS are required to know the switching pattern of the transmit and receive antennas as well as having to synchronize operations. This technique may also require the addition of switching logic at the MS, which will increase the cost of the MS.

SUMMARY OF THE INVENTION

These and other problems are generally solved or circumvented, and technical advantages are generally achieved, by embodiments of a system and method for channel status information feedback in a wireless communications system.

In accordance with an embodiment, a method for determining channel state information (CSI) at a base station (BS) of a wireless communications system is provided. The method includes receiving a transmission containing feedback information from a mobile station (MS), decoding the received transmission, computing estimates of CSI for channel elements of N−M receive-only antennas using the decoded transmission, computing estimates of CSI for channel elements of M receive/transmit antennas using channel reciprocity, and computing a precoding matrix from the channel elements for the N−M receive-only antennas and the M receive/transmit antennas. The MS includes N total antennas, M receive/transmit antennas, N−M receive-only antennas, wherein N and M are integers and N>M.

In accordance with another embodiment, a method for determining channel state information (CSI) at a mobile station (MS) of a wireless communications system is provided. The MS includes N total antennas, M receive/transmit antennas, and N−M receive-only antennas, wherein N and M are integers and N>M, and the wireless communications system includes a base station (BS). The method includes acquiring CSI for channels between the BS and the MS, computing feedback information for the N−M receive-only antennas based on the acquired CSI, and transmitting the feedback information to the BS.

In accordance with another embodiment, a method for determining channel state information (CSI) at a mobile station (MS) of a wireless communications system is provided. The MS includes N total antennas, M receive/transmit antennas, N−M receive-only antennas, wherein N and M are integers and N>M, and the wireless communications system includes a base station (BS). The method includes changing the antennas of the MS to a configuration of transmit and receive antennas, acquiring CSI, computing feedback information for N−M' receive-only antennas based on the acquired CSI, and transmitting the feedback information to the BS.

After the changing, the MS has N total antennas, M' receive/transmit antennas, N−M' receive-only antennas, wherein M' is an integer and N>M'.

An advantage of an embodiment is that both quantized channel feedback and channel reciprocity is used simultaneously, a BS can obtain full CSI in situations where there are fewer transmit antennas than transmit/receive antennas.

A further advantage of an embodiment is that information required for channel reciprocity may be derived from the received quantized channel feedback information. Therefore, channel reciprocity may be utilized without requiring additional feedback information or a sounding channel transmission, thereby reducing feedback overhead.

Yet another advantage of an embodiment is that since quantized channel information is provided for subset of antennas at the MS, the dimension of the quantized channel is reduced (from K×N to K×M, where N>M). This may reduce the size of a codebook used for quantized channel information feedback. With a smaller codebook, storage requirements may correspondingly decrease. Additionally, a smaller codebook may also reduce feedback overhead due to a smaller index size.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 4a is a flow diagram of base station operations in determining CSI of downlink channels;

FIG. 4b is a flow diagram of base station operations in determining CSI of downlink channels;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system operating in TDD mode. The invention may also be applied to a variety of wireless communications system transmission mechanisms, such as orthogonal frequency division multiple access (OFDMA), code division multiple access (CDMA), time division multiple access (TDMA), frequency division multiple access (FDMA), spatial division multiple access (SDMA), and so on.

Figure 1:
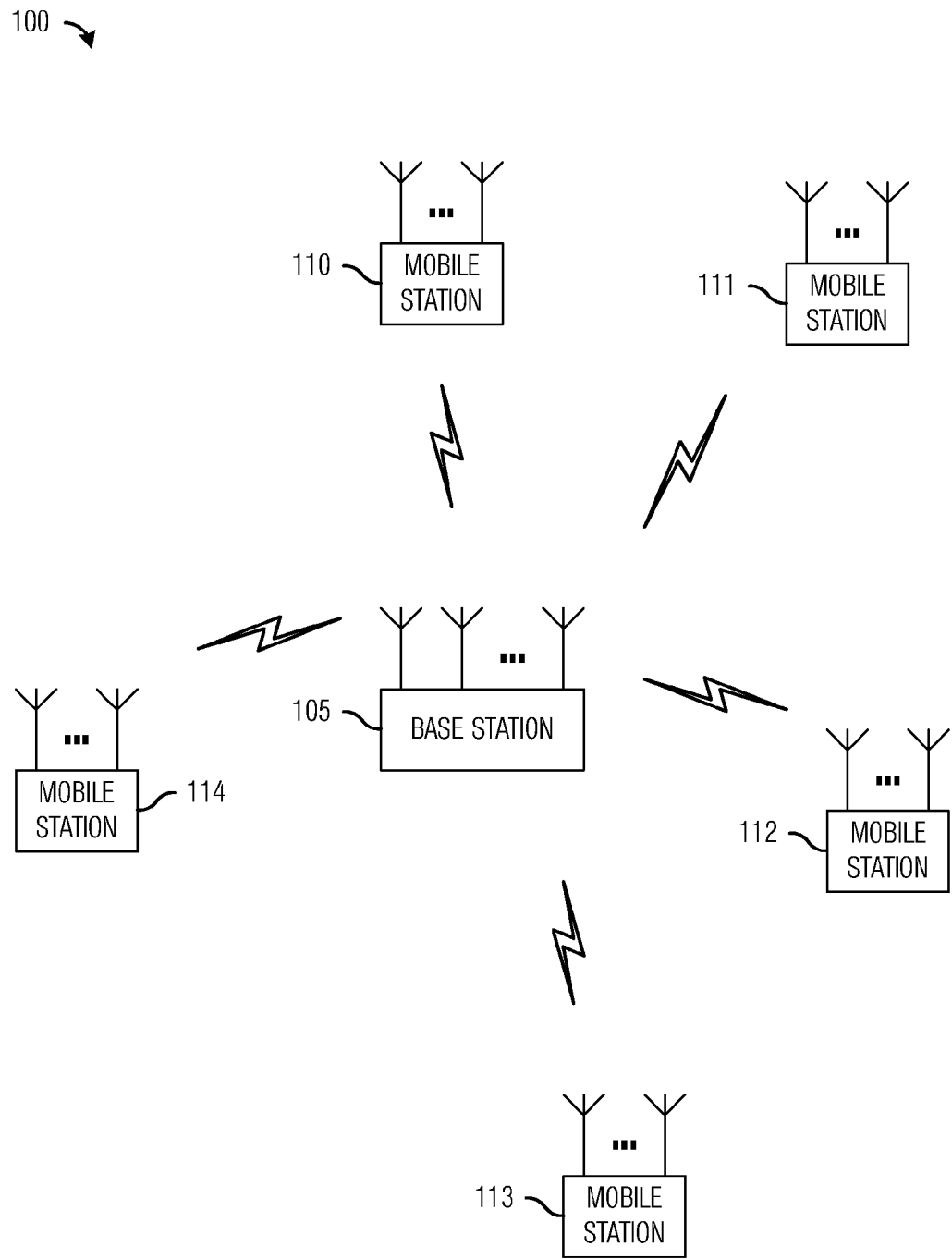
FIG. 1 is a diagram of a wireless communications system.

FIG. 1 illustrates a wireless communications system 100. Wireless communications system 100 includes a base station (BS) 105. BS 105 may be responsible for serving mobile stations (MSs) operating within its coverage area, including but not limited to MSs 110 through 114. In general, BS 105 may transmit information for a MS over a downlink (DL) and allocate resources to a MS on an uplink (UL) based on a resource request for the MS. In order to more efficiently utilize available bandwidth, BS 105 and MSs 110 through 114 may use MU-MIMO, which may allow simultaneous transmissions to multiple MSs or simultaneous transmissions from one or more MSs. Generally, the number of simultaneous transmissions may be dependent on factors such as communications system configuration, number of transmit antennas, number of receive antennas, and so forth.

BS 105 may have a number of transmit antennas (K) and a number of receive antennas (L). For purposes of discussion, let K=L. Therefore, BS 105 has K transmit antennas and K receive antennas. Generally, this configuration may be implemented with K receive/transmit antennas. A MS, such as MS 110, may have M transmit-only antennas and N total antennas. Generally, since it is more expensive to implement a transmit antenna than a receive antenna due to the high cost of power amplifiers, a MS will have more receive antennas than transmit antennas (N>M). In other words, MS 110 has N total antennas, M receive/transmit antennas, N−M receive-only antennas, where N>M.

Figure 2:
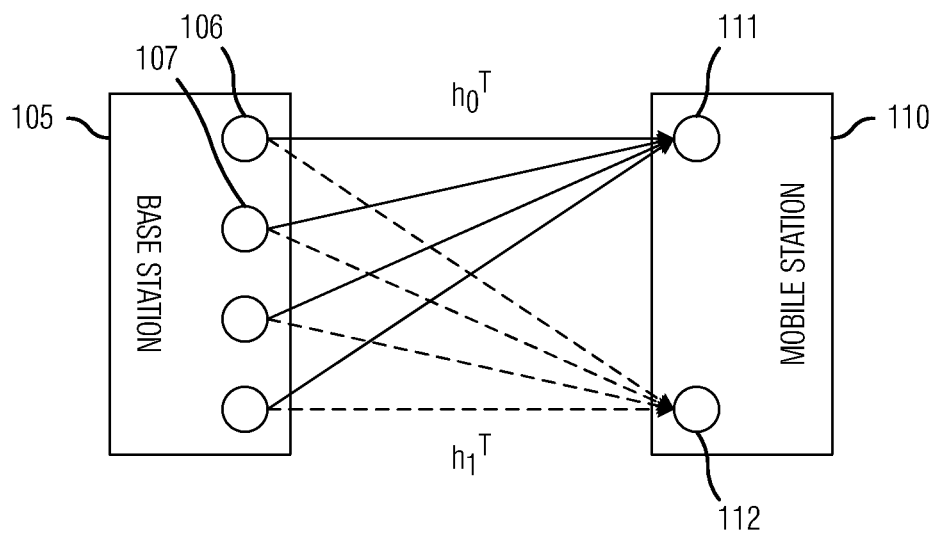
FIG. 2 is a diagram of a portion of a wireless communications system.

FIG. 2 illustrates a detailed view of BS 105 and MS 110. As shown in FIG. 2, BS 105 has four antennas, such as antenna 106 and antenna 107, which may be used as both transmit antennas and receive antennas. MS 110 has two antennas, antenna 111 and antenna 112, with both antennas capable of operating as receive antennas, but only one antenna (antenna 111, for example) operable as a transmit antenna. Let $h_0^T$ represent the channel between the four antennas of BS 105 and antenna 111 of MS 110 and $h_1^T$ represent the channel between the four antennas of BS 105 and antenna 112 of MS 110.

In order to fully exploit performance improvements offered by MIMO, BS 105 may need to have CSI of both the channel between the four antennas of BS 105 and antenna 111 ($h_0^T$) and the channel between the four channels of BS 105 and antenna 112 ($h_1^T$). If both antennas 111 and 112 are transmit antennas, then BS 105 may simply use channel reciprocity to determine CSI of channels $h_0^T$ and $h_1^T$ based on UL transmissions from both antennas of MS 110, such as sounding channel transmissions or other transmissions from MS 110. However, since only antenna 111 may transmit, BS 105 may only be capable of determining CSI of channel $h_0^T$ based on sounding channel transmissions from antenna 111 of MS 110.

Figure 3:
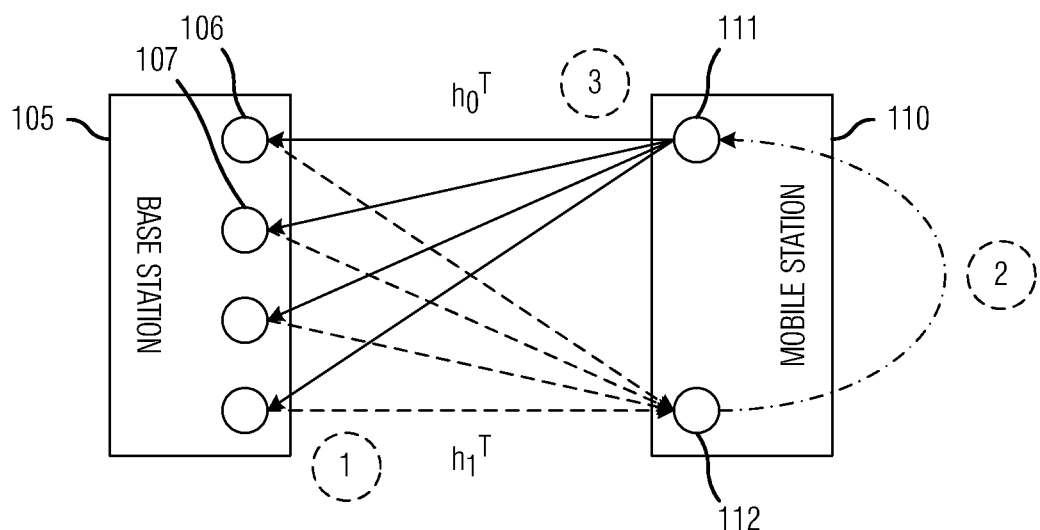
FIG. 3 is a diagram of a portion of a wireless communications system, wherein wireless communications system makes use of CSI feedback of a downlink channel to provide CSI for channels of receive antennas without transmission capability.

FIG. 3 illustrates a portion of a wireless communications system 300, wherein wireless communications system 300 makes use of CSI feedback of a DL channel to provide CSI for channels of receive antennas without transmission capability.

As shown in FIG. 3, antenna 112 of MS 110 operates as a receive antenna but is incapable of operating as a transmit antenna. Therefore, it may not be possible for BS 105 to utilize TDD-based CSI techniques, such as channel reciprocity, to determine CSI of the channel between BS 105 and antenna 112 of MS 110. Therefore, for receive antennas that cannot transit, a FDD-based CSI technique may be used to provide CSI of the channel to BS 105.

For example, transmissions made by BS 105 to MS 110 and received by antenna 112 (over channel $h_1^T$ (shown as numbered circle 1)) may be used by MS 110 to compute CSI of the channel $h_1^T$. For example, MS 110 may use pilots transmitted by BS 105 to compute CSI. Alternatively, MS 110 may utilize observed transmissions made by BS 105 over time to compute CSI. CSI of the channel may then be transmitted back to BS 105 over antenna 111 and channel $h_0^T$ (shown as numbered circles 2 and 3).

CSI computed by MS 110 may be transmitted back (feedback) to BS 105 in its analog form. For example, in a WiMAX wireless communications system, CSI may be fedback to BS 105 over Channel Quality Indicator Channel (CQICH). Alternatively, to reduce feedback channel overhead, CSI may be quantized. A commonly used technique for quantization may be implemented by selecting a codeword in a codebook representative of the channel and the codeword may be fedback to BS 105. In yet another alternative, an index of the codeword in the codebook may be fedback to BS 105. The use of codebooks, codewords, and indices is considered to be well known to those of ordinary skill in the art of the embodiments and will not be discussed further herein. BS 105, after receiving the feedback from MS 105, may decode the feedback to determine CSI of channel $h_1^T$.

Although the above discussion focuses on a MS with a total of two antennas (N=2) and only one of the two antennas capable of transmitting (M=1), the embodiments may be readily extended to larger numbers of antennas. For example, a MS may have a total of four antennas (N=4) with only two of the four antennas capable of transmitting (M=2). Therefore, the discussion of a MS with N=2 and M=1 should not be construed as being limiting to either the scope or the spirit of the embodiments.

As an example, consider a BS and MS pair as shown in FIG. 2, wherein BS 105 has four transmit/receive antennas (K=4) and MS 110 has two receive antennas (N=2) and one transmit antenna (M=1). Furthermore, let antenna 111 be the transmit/receive antenna and antenna 112 be the receive-only antenna. Also, let a codebook C be defined as C={$c_1$, $c_2$, . . . , $c_X$}, where $c_i$ is the i-th codeword of codebook C and X is the size of the codebook.

At every quantized channel feedback period (i.e., each time BS 105 determines CSI of DL channels), MS 110 obtains one codeword from the codebook C such that $$\bar{h}_1 = \operatorname*{argmin}_{1 \leq i \leq X} |c_i - h_1|^2.$$

The codeword selected by MS 110 ($\bar{h}_1$) may be encoded into a feedback channel using L coded symbols (plus additional symbols, such as pilot symbols, depending on feedback channel structure) with the sequence being denoted Z (with size 1×L). MS 110 may then feedback Z to BS 105 using antenna 111.

BS 105 may then receive the transmission from MS 110, with the received signal at BS 105 being denoted as:

$$Y = h_0 z + N,$$

where Y and N are 4×L matrices. BS 105 may then decode the encoded codeword (Z) to obtain the estimated channel ($\bar{h}_1$).

Once BS 105 identifies the quantized channel information Z, it may then re-encode the quantized channel information to further estimate the channel ($h_0$) such that $$\bar{h}_0 = Y z^H (z z^H)^{-1}$$
$$= h_0 + N z^H (z z^H)^{-1}.$$

In this way, BS 105 may estimate CSI of antenna 111 at MS 110 without requiring MS 110 to transmit any sounding messages on the sounding channel. This may help to reduce overhead in determining CSI of DL channels. BS 105 now has full channel information. BS 105 may then combine the information of $\bar{h}_1$ and $\bar{h}_0$ into a precoding matrix.

FIG. 4a illustrates a flow diagram of BS operations 400 in determining CSI of DL channels in a wireless communications system. BS operations 400 may be descriptive of operations taking place in a BS of a wireless communications system as the BS determines CSI of DL channels in order to maximize the performance of the wireless communications system. BS operations 400 may take place periodically. For example, the frequency that BS operations 400 occurs may be based on factors such as desired accuracy of CSI of DL channels, expected mobility of MSs being served by the BS, available processing power of the BS, the amount of overhead to be dedicated to determining CSI, and so forth.

BS operations 400 may begin with the BS receiving transmissions (feedback) from a MS (or several MSs), wherein the transmissions contain CSI pertaining to K×(N−M) channel elements, where K is the number of receive antennas at the BS, N is the number of receive antennas at the MS, and M is the number of transmit antennas at the MS (block 405). The transmission may contain CSI in its analog form, a quantized representation (a codeword) of CSI, an index to a codebook that points to the codeword, or so forth. In general, the transmission of CSI in its analog form may require the dedication of a significant amount of bandwidth for the transmission of feedback information. Therefore, the transmission of the quantized representation (the codeword) or the index of the quantized representation may help to reduce the bandwidth requirements of the feedback channel.

Once the BS receives the transmissions, the BS may decode the received transmissions and use the decoded information to estimate a precoding vector for each of the K×(N−M) DL channel elements (block 410). The BS may also compute estimates of precoding vectors for the remaining K×M DL channel elements based on the received transmissions and using channel reciprocity (block 415). The BS may make use of a decision feedback scheme to utilize whole feedback channels to estimate the K×M DL channel elements. By reusing the received transmissions, the BS may further help to reduce feedback channel overhead by eliminating the need for the MS to transmit on sounding channels. The BS may then be able to create a precoding matrix from the K×M DL channel elements computed using channel reciprocity and the K×(N−M) DL channel elements computed using quantization feedback information (block 420). BS operations 400 may then terminate.

FIG. 4b illustrates a flow diagram of BS operations 450 in determining CSI of DL channels in a wireless communications system. BS operations 450 may be descriptive of operations taking place in a BS of a wireless communications system as the BS determines CSI of DL channels in order to maximize the performance of the wireless communications system. BS operations 450 may take place periodically. For example, the frequency that BS operations 450 occurs may be based on factors such as desired accuracy of CSI of DL channels, expected mobility of MSs being served by the BS, available processing power of the BS, the amount of overhead to be dedicated to determining CSI, and so forth.

BS operations 450 may begin with the BS receiving transmissions from the M transmit antennas of the MS (block 455). The transmissions from the M transmit antennas may be in the form of sounding transmissions transmitted on sounding channels from the MS. Alternatively, the transmissions may be in the form of a known sequence from the M transmit antennas of the MS, with the known sequence potentially being different for each of the M transmit antennas or the known sequence may in some other way be uniquely identified for each of the M transmit antennas. The BS may then compute CSI for each of the K×M antenna elements (block 460). The BS may be using channel reciprocity, for example.

BS operations 450 may then continue with the BS receiving transmissions (feedback) from a MS (or several MSs), wherein the transmissions contain CSI pertaining to K×(N−M) channel elements, where K is the number of receive antennas at the BS, N is the number of receive antennas at the MS, and M is the number of transmit antennas at the MS (block 465). The transmission may contain CSI in its analog form, a quantized representation (a codeword) of CSI, an index to a codebook that points to the codeword, or so forth. In general, the transmission of CSI in its analog form may require the dedication of a significant amount of bandwidth for the transmission of feedback information. Therefore, the transmission of the quantized representation (the codeword) or the index of the quantized representation may help to reduce the bandwidth requirements of the feedback channel.

Once the BS receives the transmissions, the BS may decode the received transmissions and use the decoded information to estimate a precoding vector for each of the K×(N−M) DL channel elements (block 470). The BS may then be able to create a precoding matrix from the K×M DL channel elements computed using channel reciprocity and the K×(N−M) DL channel elements computed using quantization feedback information (block 475). BS operations 450 may then terminate.

Figure 5:
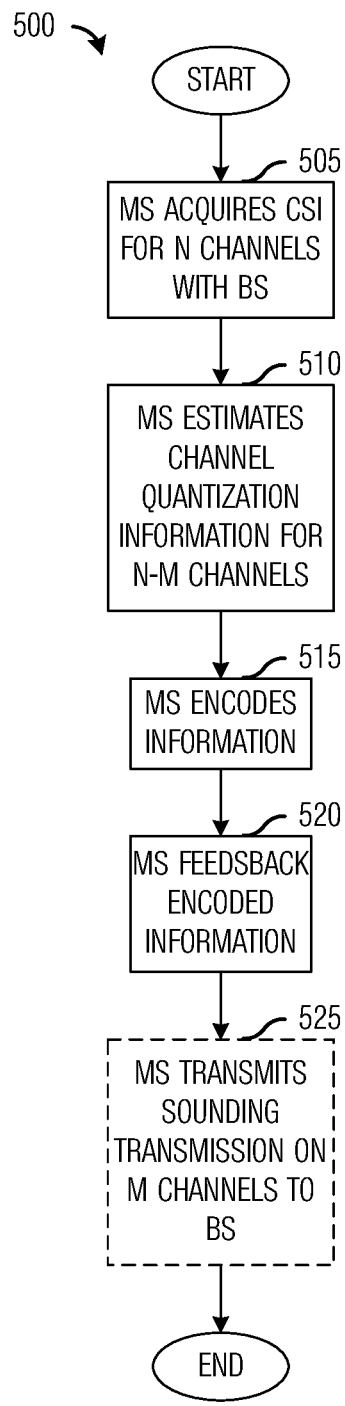
FIG. 5 is a flow diagram of mobile station operations in determining CSI of downlink channels.

FIG. 5 illustrates a flow diagram of MS operations 500 in determining CSI of DL channels in a wireless communications system. MS operations 500 may be descriptive of operations taking place in a MS of a wireless communications system, wherein a BS determines CSI of DL channels in order to maximize the performance of the wireless communications system. MS operations 500 may take place periodically. For example, the frequency that MS operations 500 occurs may be based on factors such as desired accuracy of CSI of DL channels, expected mobility of MSs being served by the BS, available processing power of the BS, the amount of overhead to be dedicated to determining CSI, and so forth.

MS operations 500 may begin with the MS acquiring CSI for each of the N channels between the MS and the BS, wherein N is the number of receive antennas at the MS (block 505). The MS may acquire CSI for each of the N channels by receiving pilots transmitted by the BS. Alternatively, the MS may acquire CSI for the N channels by receiving transmissions made by the BS over a period of time.

After acquiring CSI for the N channels, the MS may estimate channel quantization information for the N−M channels (block 510). According to a preferred embodiment, the MS may estimate the channel quantization information by selecting a codeword from a codebook representative of channels between the BS and the MS. The codeword selected from the codebook is intended to be a best representation of the channel between the BS and one of the N−M channels available in the codebook. The quantization of CSI may help to reduce bandwidth requirements of a feedback channel used to feedback CSI to the BS. To further help to reduce bandwidth requirements, the MS may use an index to the codebook that is representative of a location of the codeword in place of the codeword. Since the codebook is known at both the MS and the BS, an index may be sufficient to indicate the selected codeword.

The MS may then encode the selected codeword (or the index of the selected codeword) (block 515) and transmit the encoded codeword or encoded index to the BS (block 520). In an optional operation, the MS may transmit an additional transmission to the BS to allow the BS to determine CSI of channels related to the M transmit antennas of the MS (block 525). For example, the MS may transmit sounding messages on a sounding channel between the MS and the BS. If the BS makes use of the encoded information previously transmitted by the MS to determine CSI of channels related to the M transmit, then it may not be necessary for the MS to transmit additional information to the BS. MS operations 500 may then terminate.

Figure 6:
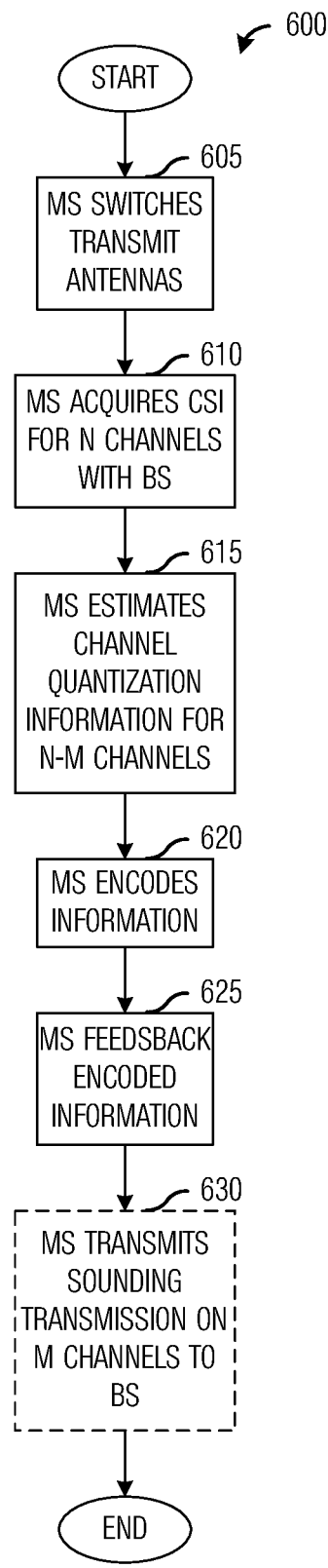
FIG. 6 is a flow diagram of mobile station operations in determining CSI of downlink channels, wherein mobile station antenna switching is utilized.

FIG. 6 illustrates a flow diagram of MS operations 600 in determining CSI of DL channels in a wireless communications system. MS operations 600 may be descriptive of operations taking place in a MS of a wireless communications system, wherein a BS determines CSI of DL channels in order to maximize the performance of the wireless communications system. MS operations 600 may take place periodically. For example, the frequency that MS operations 600 occurs may be based on factors such as desired accuracy of CSI of DL channels, expected mobility of MSs being served by the BS, available processing power of the BS, the amount of overhead to be dedicated to determining CSI, and so forth.

MS operations 600 may begin with the MS switching transmit and receive antennas (block 605). According to an embodiment, the MS may periodically switch transmit and receive antennas. For example, the MS may switch transmit and receive antennas once each time that the BS determines CSI of the channels (i.e., a quantized channel feedback period). Alternatively, the MS may switch transmit and receive antennas rapidly enough within a quantized channel feedback period so that the BS may use channel reciprocity to determine CSI of the channels within the single quantized channel feedback period. In yet another alternative, the MS may switch transmit and receive antennas once per specified number of quantized channel feedback periods.

Each time that the MS switches transmit and receive antennas a known number of transmit and receive antennas may switch operation, with a receive-only antenna becoming a receive and transmit antenna, and vice versa. For example, if the MS has a total of four antennas: antennas A, B, C, and D with antennas A and B being transmit-only antennas, then after a transmit and receive antennas switch, the MS may have antennas C and D being receive-only antennas. Alternatively, after a transmit and receive antennas switch, the MS may have antennas B and C being receive-only antennas. According to an embodiment, multiple transmit and receive antenna switches may be required before all of the receive-only antennas have become transmit and receive antennas at least once. Over time, the BS may be able to determine CSI of each of the N antennas at the MS using channel reciprocity (or some other TDD-based technique).

According to an embodiment, both the frequency of the antenna switches and a sequence or order of the antenna switching are known at both the MS and the BS. As an example, information regarding the antenna switching may be known at both the MS and the BS based on information stored at both the MS and the BS, i.e., a known sequence of antenna switching is used at the MS. Alternatively, prior to switching antennas, the MS may signal the BS, informing the BS of the imminent antenna switching and which antennas will be switching. The signaling of the antenna switching may be made during a previous quantized channel period or whenever the MS transmits information back to the BS, for example. Furthermore, both the MS and BS operate in relative synchrony to help ensure that the antenna switch at the MS and corresponding changes at the BS occur at substantially the same time.

After the MS switches transmit and receive antennas, the MS may acquire CSI for each of the N channels between the MS and the BS, wherein N is the number of receive antennas at the MS (block 610). The MS may acquire CSI for each of the N channels by receiving pilots transmitted by the BS. Alternatively, the MS may acquire CSI for the N channels by receiving transmissions made by the BS over a period of time.

After acquiring CSI for the N channels, the MS may estimate channel quantization information for the N–M channels (block 615). According to a preferred embodiment, the MS may estimate the channel quantization information by selecting a codeword from a codebook representative of channels between the BS and the MS. The codeword selected from the codebook is intended to be a best representation of the channel between the BS and one of the N–M channels available in the codebook. The quantization of CSI may help to reduce bandwidth requirements of a feedback channel used to feedback CSI to the BS. To further help to reduce bandwidth requirements, the MS may use an index to the codebook that is representative of a location of the codeword in place of the codeword. Since the codebook is known at both the MS and the BS, an index may be sufficient to indicate the selected codeword.

The MS may then encode the selected codeword (or the index of the selected codeword) (block 620) and transmit the encoded codeword or encoded index to the BS (block 625). In an optional operation, the MS may transmit an additional transmission to the BS to allow the BS to determine CSI of channels related to the M transmit antennas of the MS (block 630). For example, the MS may transmit sounding messages on a sounding channel between the MS and the BS. If the BS makes use of the encoded information previously transmitted by the MS to determine CSI of channels related to the M transmit, then it may not be necessary for the MS to transmit additional information to the BS. MS operations 600 may then terminate.

For example, consider a BS and MS pair as shown in FIG. 2, wherein BS 105 has four transmit/receive antennas (K=4) and MS 110 has two receive antennas (N=2) and one transmit antenna (M=1). Let at time T=1, MS 110 will transmit using antenna 111, at time T=2, MS 110 will transmit using antenna 112, at time T=3, MS 110 will transmit using antenna 111, and so forth.

Then, while in operation and prior to time T=1, MS 110 calculates a quantized channel vector using antenna 112 and generates feedback information for the quantized channel vector. At time T=1, MS 110 may then transmit the feedback information using antenna 111. Prior to time T=2, MS 110 calculates a quantized channel vector using antenna 111 and generates feedback information for the quantized channel vector. At time T=2, MS 110 may then transmit the feedback information using antenna 112. MS 110 may continue to switch transmit and receive antennas as long as it is in normal operation. By periodically switching receive and transmit antennas, a quantization error level of both antennas 111 and 112 may average out over time.

The order of the events described herein may be changed, the operations may be performed in a different order, or some of the operations may be performed at the same time to meet particular requirements of the various embodiments.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining channel state information (CSI) at a base station (BS) of a wireless communications system, the method comprising: receiving a transmission containing feedback information from a mobile station (MS) having N total antennas, M receive/transmit antennas, N–M receive-only antennas, wherein N and M are integers and N>M; decoding the received transmission; computing estimates of CSI for channel elements of N–M receive-only antennas using the decoded transmission; computing estimates of CSI for channel elements of M receive/transmit antennas using channel reciprocity; and computing a precoding matrix from the channel elements for the N–M receive-only antennas and the M receive/transmit antennas.

2. The method of claim 1, wherein the wireless communications system is a time division duplex (TDD) wireless communications system.

3. The method of claim 1, wherein the received transmission comprises a representation of a channel between the BS and a receive-only antenna at the MS.

4. The method of claim 1, wherein the received transmission comprises a representation of a channel between the BS and a receive-only antenna for each of the N–M receive-only antennas.

5. The method of claim 1, wherein the received transmission comprises an encoded representation of a channel between the BS and a receive-only antenna at the MS.

6. The method of claim 1, wherein the decoded transmission comprises an analog representation of CSI, a quantized representation of CSI, or an index to a codebook containing quantized representations of CSI.

7. The method of claim 1, wherein the computing estimates of CSI for channel elements of M receive/transmit antennas comprises: re-encoding the decoded transmission; and estimating CSI for channel elements of M receive/transmit antennas based on the re-encoded transmission.

8. The method of claim 7, wherein the estimating makes use of a decision feedback technique.

9. The method of claim 8, wherein the estimating further makes use of channel reciprocity.

10. The method of claim 1, further comprising prior to computing estimates of CSI for channel elements of M receive/transmit antennas, receiving a sounding transmission from the M receive/transmit antennas.

11. The method of claim 10, wherein the sounding transmission is transmitted over a sounding channel.

12. The method of claim 10, wherein the computing estimates of CSI for channel elements of M receive/transmit antennas comprises estimating CSI for channel elements of M receive/transmit antennas based on the received sounding transmission using channel reciprocity.

13. The method of claim 1, further comprising prior to computing estimates of CSI for channel elements of M receive/transmit antennas, receiving a second transmission from the M receive/transmit antennas.

14. A method for determining channel state information (CSI) at a mobile station (MS) of a wireless communications system, the wireless communications system having a base station (BS), the method comprising:
acquiring CSI for channels between the BS and the MS, the MS having N total antennas, M receive/transmit antennas, and N−M receive-only antennas, wherein N and M are integers and N>M;
computing feedback information for the N−M receive-only antennas based on the acquired CSI; and transmitting the feedback information to the BS.

15. The method of claim 14, wherein the acquiring CSI comprises measuring a pilot transmitted by the BS.

16. The method of claim 14, wherein the acquiring CSI comprises measuring transmissions made by the BS over a period of time.

17. The method of claim 14, wherein the acquiring CSI comprises acquiring CSI for each of the N antennas.

18. The method of claim 14, wherein the computing feedback information comprises: quantizing the acquired CSI for the N−M receive-only antennas; encoding the quantized CSI; and selecting the encoded CSI as the feedback information.

19. The method of claim 18, wherein the quantizing comprises, for each receive-only antenna, selecting a codeword from a codebook containing a plurality of quantized representations of a channel as the quantized CSI.

20. The method of claim 19, wherein the codebook is known at the MS and the BS.

21. The method of claim 18, wherein the quantizing comprises, for each receive-only antenna, selecting an index of a codeword from a codebook containing a plurality of quantized representations of a channel as the quantized CSI.

22. The method of claim 14, wherein the computing feedback information comprises selecting the acquired CSI as the feedback information.

23. The method of claim 22, wherein the transmitting a transmission on the M receive/transmit antennas comprises transmitting a sounding transmission over a sounding channel.

24. The method of claim 14, further comprising, transmitting a transmission on the M receive/transmit antennas to the BS.

25. A method for determining channel state information (CSI) at a mobile station (MS) of a wireless communications system, the MS having N total antennas, M receive/transmit antennas, N−M receive-only antennas, wherein N and M are integers and N>M, the wireless communications system having a base station (BS), the method comprising: changing the antennas of the MS to a configuration of transmit and receive antennas, wherein after the changing, the MS has N total antennas, M' receive/transmit antennas, N−M' receive-only antennas, wherein M' is an integer and N>M'; acquiring CSI; computing feedback information for N−M' receive-only antennas based on the acquired CSI; and transmitting the feedback information to the BS.

26. The method of claim 25, wherein the configuration of transmit and receive antennas at the MS is known at the BS.

27. The method of claim 25, wherein the changing comprises: switching M' antennas of the MS to operate as receive/transmit antennas; and switching N−M' antennas of the MS to operate as receive-only antennas.

28. The method of claim 25, wherein the changing follows a specified sequence.

29. The method of claim 25, further comprising prior to the changing, signaling the configuration of transmit and receive antennas to the BS.

30. The method of claim 25, wherein the changing occurs periodically over time.

31. The method of claim 25, wherein the computing feedback information comprises: quantizing the acquired CSI for the N−M' receive-only antennas; encoding the quantized CSI; and selecting the encoded CSI as the feedback information.

32. The method of claim 31, wherein the encoding the quantized CSI comprises encoding the quantized CSI into L symbols, wherein L is a number based on a structure of a feedback channel.

33. The method of claim 32, wherein the encoded CSI further comprises a number of pilot symbols.

* * * * *